July 4, 1967  L. J. VILUTIS  3,329,549
FILM LAMINATING APPARATUS AND METHOD
Filed Aug. 14, 1963  3 Sheets-Sheet 1

INVENTOR.
Leonard J. Vilutis
BY
Robert R. Lockwood
ATTORNEY

July 4, 1967   L. J. VILUTIS   3,329,549
FILM LAMINATING APPARATUS AND METHOD
Filed Aug. 14, 1963   3 Sheets-Sheet 2

INVENTOR.
Leonard J. Vilutis
BY
Robert R. Lockwood
ATTORNEY

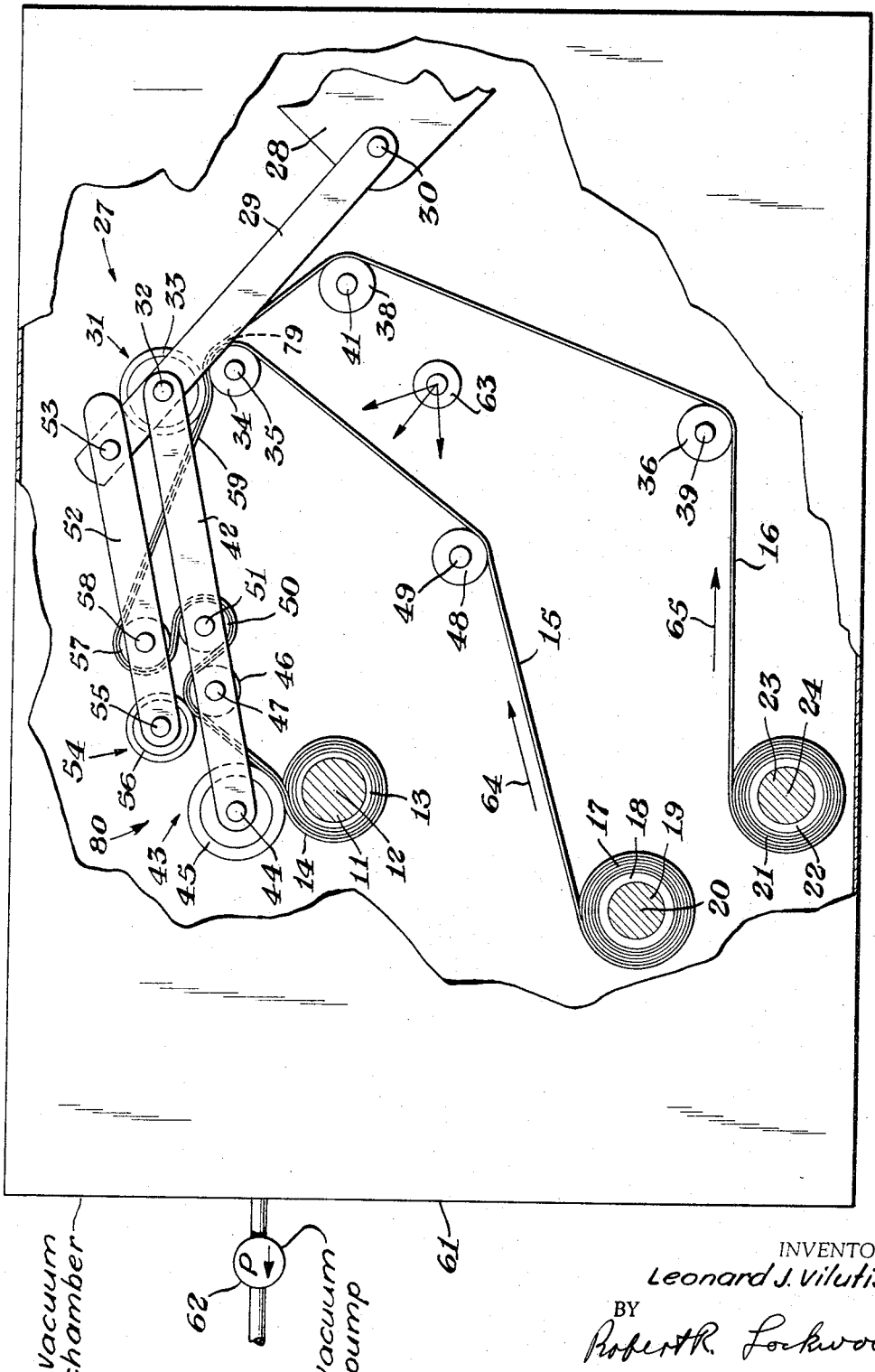

United States Patent Office 3,329,549
Patented July 4, 1967

3,329,549
FILM LAMINATING APPARATUS AND METHOD
Leonard J. Vilutis, 12003 S. Princeton,
Chicago, Ill. 60628
Filed Aug. 14, 1963, Ser. No. 302,060
26 Claims. (Cl. 156—272)

This application is a continuation-in-part of U.S. Ser. No. 249,760, which was filed on Jan. 7, 1963, now abandoned.

This invention relates to apparatus for laminating flexible films. The term "film" is used herein to designate both thermoplastic and non-thermoplastic film and sheet-like structures having a thickness of up to about .10 of an inch.

It is desirable to laminate similar and dissimilar film materials. This has been accomplished using a layer of adhesive between the individual films, by the application of high pressure and by the application of heat. These methods have been employed singly or in combination. In some instances a second film is extruded on a dissimilar film and thus becomes bonded to it to form a two layer lamination. It is difficult and expensive to laminate films in these manners. When an attempt is made to laminate two films without application of heat, high pressure or adhesive material air is often trapped between them. This makes the resulting product unattractive and not particularly suitable for the packing of goods, such as foodstuff, where a high degree of transparency of the container is desired.

Among the objects of this invention are: To provide for laminating a plurality of similar and dissimilar films that may or may not be dusted, the films being of the kind and character above referred to and the laminating being performed in a new and improved manner; to laminate the films by excluding substantially all of the air from between them as they are being laminated; to employ a laminating pressure that is under the control of the tension of one of the films which tension is substantially constant, the laminating pressure being relatively light for squeezing out air from between the films; to remove air from the space where the films initially are juxtaposed in order to reduce the amount of air required to be squeezed out from between the films when they are being laminated; to increase the adherence of the films after they are laminated by applying an electrostatic charge to one side of one of them for a two layer lamination and to both sides of an intermediate film for a three layer lamination; and to laminate films where the juxtaposed surfaces are rough or embossed or dusted.

In the drawings:

FIG. 3 shows certain additional modifications.

Figure 1:
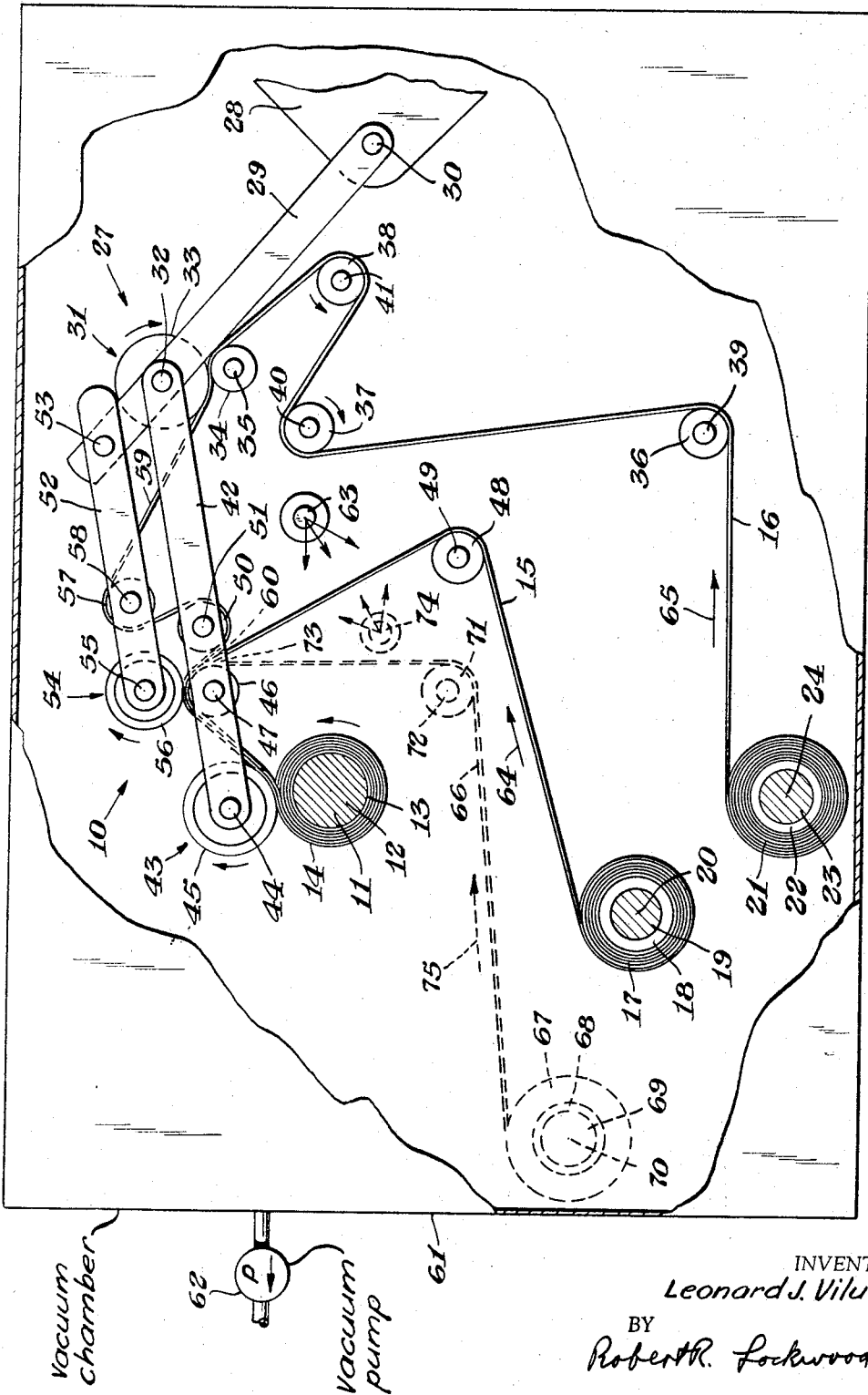
FIG. 1 illustrates, somewhat diagrammatically, the construction and mode of operation of laminating apparatus embodying this invention.

Referring now to FIG. 1 of the drawing, it will be observed that the reference character 10 designates, generally, laminating apparatus which can be employed for the purpose of laminating a plurality of flexible films. For this purpose a rewind shaft 11 is employed and it is suitably driven in a counter clockwise direction at a constant speed by a drive motor (not shown). As is conventional the rewind shaft 11 is arranged to be rotated about a horizontal axis, indicated at 12, and it is surrounded by a fiber cylindrical core 13 that is secured suitably against rotation to the rewind shaft 11 so that it rotates therewith. A roll 14 of laminated film is wound on the core 13 as the rewind shaft 11 is rotated to accomplish this purpose.

The laminated film forming the roll 14 for a two layer film comprises an inner film 15 and an outer film 16. The films 15 and 16 may be of the same material, such as a crystalline copolymer of vinylidene chloride and vinyl chloride, having a thickness in the range above noted or one of the films may be of this material and the other may be of another thermoplastic material such as polyethylene, or a non-thermoplastic material such as regenerated cellulose.

The inner film 15 is unwound from a roll 17 of this material that has been wound on a fiber cylindrical core 18 which is secured against rotation to an upper unwind shaft 19 which is rotatable about a horizontal stationary axis 20 that is parallel to the horizontal axis 12 of rotation of the rewind shaft 11. Similarly the outer film 16 is unwound from a roll 21 of this material that has been wound on a fiber cylindrical core 22 which is secured against rotation to a lower unwind shaft 23 that is rotatable about a stationary horizontal axis 24 parallel to the axes 12 and 20. Provision is made for applying a slight braking force to each of the shafts 19 and 23 which is sufficient to maintain the films 15 and 16 taut and just sufficient to prevent continued rotation or spinning of the rolls 17 and 21 when a torque no longer is applied for rotating the rewind shaft 11.

It is desirable that the inner and outer films 15 and 16 be juxtaposed to provide the two layer laminated film on the roll 14 in such manner that substantially all of the air between the films will be excluded for the purpose of providing a clear and brilliant laminated film unmarred by air bubbles. In some applications it is desirable to have a layer of ink on the side of one of the films that is to be juxtaposed to the other film. Preferably the ink is applied to one of the films and is completely dry before the laminating operation is begun.

For the purpose of laminating the films 15 and 16 and to exclude from therebetween substantially all of the air, a floating tensioning and laminating device, indicated generally at 27, is provided. The device 27 is mounted on a support 28 which may be a part of a splitter for processing thermoplastic film or on an unwinder rewinder stand. An arm 29 is pivoted about a horizontal axis 30 on the support 28. It will be observed that the horizontal axis 30 is spaced laterally from the horizontal stationary axis 12 about which the rewind shaft 11 rotates. While the arm 29 is shown as comprising a single member, it will be understood that preferably it comprises a pair of like members to form a frame and that between these members a friction roller, indicated generally at 31, is rotatably mounted about a horizontal axis 32. The friction roller 31 preferably is provided with a layer 33 of rubber for contacting one surface of the outer film 16 and for receiving this film between it and an idler roller 34 located underneath it and rotatable about a stationary axis 35. It will be understood that the idler roller 34 has a length which is coextensive with the length of the friction roller 31 and that their lengths are such as to accommodate various widths of inner and outer films 15 and 16.

The outer film 16 is directed to pass between the friction roller 31 and idler roller 34 after passing over idler rollers 36, 37 and 38 which are mounted for rotation about horizontal stationary axes 39, 40 and 41, respectively. As pointed out a slight braking force is applied to the lower unwind shaft 23 which is just enough to maintain the outer film 16 taut as it passes over the idler rollers 36, 37 and 38. However, this tension is ineffective to apply any tension beyond the location where the friction roller 31 applies pressure to the outer film 16 after it passes about the idler roller 34. It will be apparent that the weight of the floating tensioning and laminating device 27, as applied about the horizontal axis 30, is carried in part by the idler roller 34 since the friction roller 31 overlies it and in part by the roll 14 of laminated film in a manner to be described.

Pivoted about the axis 32 of rotation of the friction roller 31 to the arm 29 is a laminating lever 42. Preferably the laminating lever 42 forms a part of a frame having a similar lever parallel thereto between the outer ends of which a friction roller, shown generally at 43, is rotatably mounted about a horizontal pivot axis 44. The friction roller 43 has a layer 45 of rubber that is arranged to engage and be supported by the fiber core 13 on the rewind shaft 11 in the absence of any portion of the roll 14 of laminated film. When the laminated film is present, the friction roller 43 bears against the outer surface of the outer film 16.

A laminating roller 46 is rotatably mounted on the laminating lever 42 to rotate about a horizontal axis 47.

The inner film 15 is directed to the laminating roller 46 from the unwind shaft 19 about an idler roller 48 that is mounted for rotation about a horizontal fixed axis 49. As described, sufficient braking action is applied to the unwind shaft 19 to hold the film 15 taut and to apply some tension to that portion of this film between the idler roller 48 and laminating roller 46.

The outer film 16 is directed to the laminating roller 46 in overlying relation to the inner film 15 thereabout by an idler roller 50 which is mounted for rotation about a horizontal axis 51 on the laminating lever 42 which forms a part of a frame so that the idler roller 50 is supported thereby at its ends for rotation. Attention is directed to the fact that the idler roller 50 is mounted on the laminating lever 42 between the laminating roller 46 and the axis 32 about which the lever 42 rotates or about the axis of rotation of the friction roller 31.

It is desirable that a uniform tension be applied to the outer film 16 in the laminating zone and also to apply a light pressure to the two films for the purpose of squeezing out any air that may be present therebetween. For this purpose a tension lever 52 is employed. The tension lever 52, while shown as a single member, preferably comprises a frame which includes another member like the lever 52 with both being pivoted about a horizontal axis 53 to the arm 29 at a location beyond the friction roller 31. At its other end the tension lever 52 carries a friction roller, indicated generally at 54, which is rotatably mounted about a horizontal axis 55. The friction roller 54 has an outer layer 56 of rubber and it is arranged, in the absence of the films 15 and 16, to engage and be supported by the laminating roller 46. In the presence of the films 15 and 16, it bears against the outer surface of the outer film 16 and applies a pressure therethrough to squeeze out air that may be present therebetween.

With a view applying a controlled pressure from the friction roller 54 to the films 15 and 16 passing between it and the laminating roller 46, an idler roller 57 is mounted for rotation on the tension lever 52 about a horizontal axis 58. It will be observed that the outer film 16 is trained about the idler roller 57 and also about the idler roller 50. The portion 59 of the outer film 16 between the idler roller 57 and the friction roller 31 is tensioned initially when the films 15 and 16 are threaded over the various rollers and the roll 14 is started to be wound on the rewind shaft 11. The tension in the portion 59 of the outer film 16 remains substantially constant and thus a torque is applied to the tension lever 52 in a counterclockwise direction tending to rotate it about the axis 53. In effect the tension lever 52 functions as a second class lever with the force being applied thereto at the axis 58 and resisted by the friction roller 54 as applied from the laminating roller 46 through the inner and outer films 15 and 16 moving thereabout. As a result of the application of this constant force by the friction roller 54 under the control of the tension applied by the outer film 16 at the portion 59 thereof, substantially all of the air in the space 60 between the films 15 and 16 as they approach juxtaposition is squeezed out.

As the thickness of the roll 14 of laminated film increases on the rewind shaft 11, the laminating lever 42 and tension lever 52 are rotated correspondingly about their respective axis 32 and 53. However, within the range of the usual thickness of the roll 14 on the rewind shaft 11, there is substantially no change in the distance between the idler rollers 57 and 34 and there is substantially no change in the tension exerted by the portion 59 of the outer film 16 therebetween as the roll 14 builds up on the core 13.

The laminating operation can be improved by removing some of the air that is required to be squeezed out in the space 60 between the films 15 and 16 as they approach the laminating zone. For this purpose the laminating apparatus 10 is enclosed in a vacuum chamber 61 which surrounds the entire assembly. A vacuum pump 62 is connected to the vacuum chamber 61 and is operated to provide therein a vacuum of the order of 10″ to 29″. Since it is desired to evacuate only the space 60, the size of the vacuum chamber 61 can be reduced to include only this space and whatever additional space is required to enclose the portions of the films 15 and 16 such that the necessary vacuum seal can be created to permit the evacuation of this space. The use of the vacuum chamber 61 is particularly desirable where the juxtaposed surfaces of the films 15 and 16 are rough or they are embossed or dusted. By combining the mechanical pressure applying arrangement through the friction roller 54 under the control of the tension in the portion 59 of the outer film 16 and the evacuation of the space 60, it is possible to obtain excellent results in the final laminated product appearing in the roll 14.

Certain films are capable of receiving an electrostatic charge. When such a charge is applied to one of the surfaces, it increases the tendency of it to adhere to the juxtaposed surface of the other film. Accordingly, a high voltage electrode 63 is positioned in proximity to the side of the film 15 that is to be juxtaposed to the corresponding side of the film 16. The electrode 63 is energized at either a positive or negative potential from a suitable source of high unidirectional voltage in accordance with conventional practice, the other terminal of the source being grounded.

After the films 15 and 16 have been threaded about the various rollers as shown in FIG. 1 and the roll 14 is started on the core 13 carried by the rewind shaft 11, the latter is rotated at constant speed. The films 15 and 16 are drawn from the respective rolls 17 and 21 in the directions indicated by arrows 64 and 65. As the films pass about the laminating roller 46, the air therebetween is substantially entirely squeezed out with the result that the films 15 and 16, as laminated on the roll 14, are in juxtaposition substantially over their entire areas which face each other.

It is desirable that the parts making up the floating tensioning and laminating device 27 be relatively lightweight. The arm 29 and levers 42 and 52 preferably are formed of lightweight metal such as aluminum. The cores for the friction rollers 31, 43 and 54 likewise are formed of such material as are the rollers 46, 50 and 57. Preferably the several rollers are mounted on antifriction bearings in order to reduce to a minimum the friction forces that must be overcome.

It is possible to laminate three films instead of two films comprising the inner and outer films 15 and 16. As shown by broken lines another inner film 66 can be combined with the films 15 and 16 to form a three layer lamination. When the inner film 66 is employed, the film 15, previously referred to as the inner film, becomes an intermediate film.

The film 66 is withdrawn from a roll 67 on a fiber cylindrical core 68 that is carried by an additional unwind shaft 69 which is rotatable about a horizontal axis 70 and like the unwind shafts 19 and 23 is located below the rewind shaft 11. The film 66 is guided from the roll 67 over an idler roller 71 that is rotatable about a stationary horizontal axis 72. There is a space 73 between the sides of the films 66 and 15 that are to be juxtaposed from which the air is to be squeezed out as the three films 66, 15 and 16 move about the laminating roller 46 with pressure being applied thereto for squeezing out the air by the friction roller 54 under the control of the tension applied in the portion 59 of the outer film 16. The vacuum chamber 61 can be employed in connection with the lamination of the three layers or films 66, 15 and 16 for the purpose of reducing the air in the spaces 60 and 73 to be squeezed out by the application of pressure from the friction roller 54 under the control of the tension in the portion 59 of the outer film 16 as applied to the three layers when they move about the laminating roller 46.

Additional adherence between the films 66 and 15 can be obtained through the provision of a high voltage electrode 74 that is energized at a high unidirectional potential either positive or negative in the manner previously described for the electrode 63 the other terminal of the source being grounded.

When the three layer lamination is wound on the roll 14, the films 15 and 16 move in the manner previously described. In addition the inner film 66 is withdrawn in the direction indicated by the arrow 75 from the roll 67 and it moves with the films 15 and 16 about the laminating roller 46.

Depending upon the degree of adherence that is required between the films 15 and 16 or between the films 66, 15 and 16, use may be made selectively of the vacuum chamber 61 and of the electrodes 63 and 74. In many applications it is sufficient to apply the light pressure by the friction roller 54 under the control of the tension in the portion 59 of the outer film 16 for the purpose of squeezing out the air from between the films as they are being laminated. In other applications it is desirable to evacuate the space 60 or 73 or both and to provide for applying an electrostatic charge to one or both sides of the film 15 depending upon whether or not it is an inner film or an intermediate film.

Figure 2:
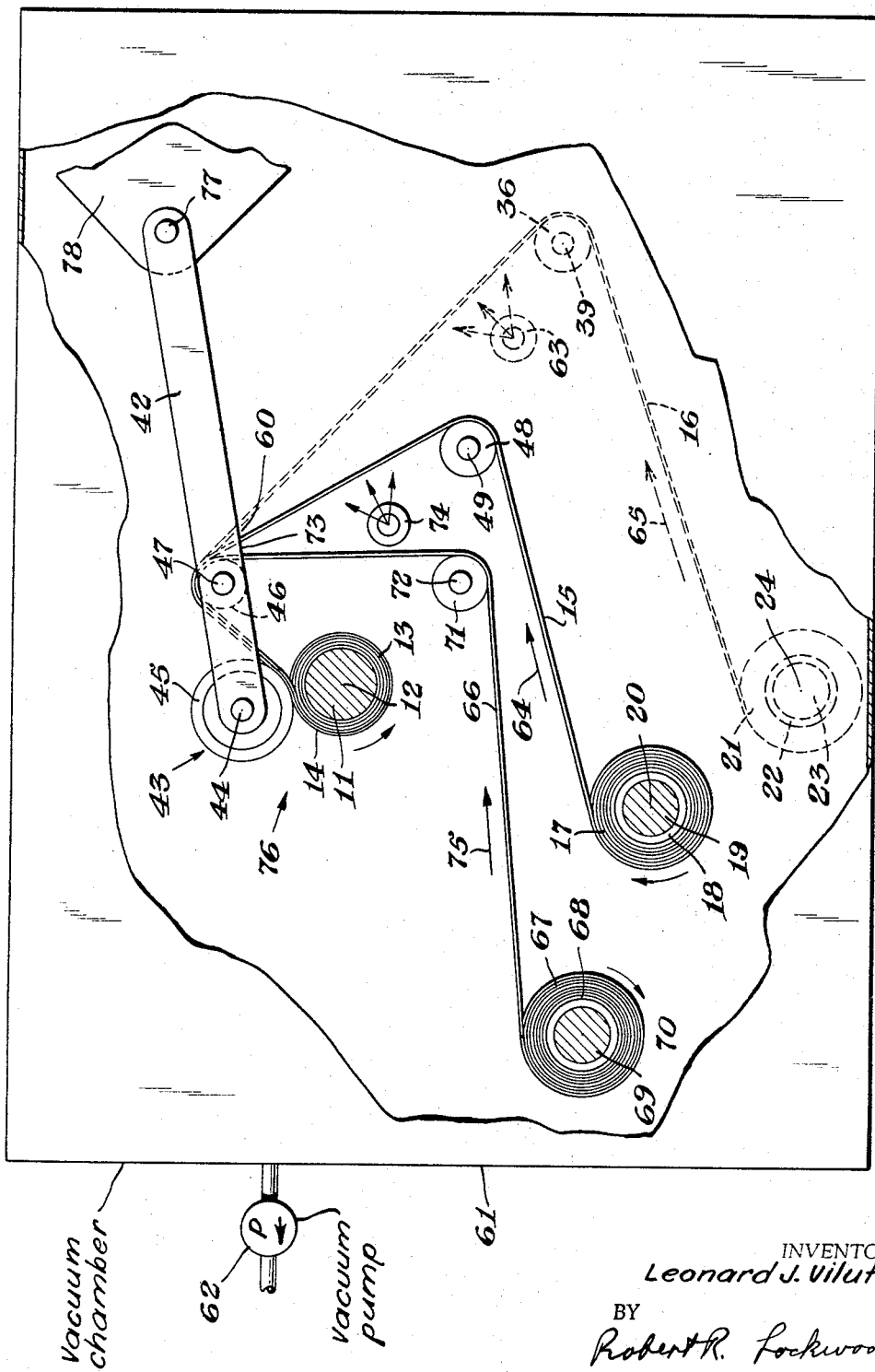
FIG. 2 shows certain modifications.

FIG. 2 shows certain modifications of the present invention. Here it will be observed that the construction of the laminating apparatus, indicated generally at 76, is similar in many respects to the laminating apparatus 10 shown in FIG. 1. Insofar as possible the same reference characters have been applied to the same elements.

In the construction shown in FIG. 2, instead of employing the floating tensioning and laminating device 27 in its entirety, only the laminating lever 42 is employed and it is mounted for rotation about a fixed axis 77 on a support 78 which may be the same support as indicated at 28 in FIG. 1. The films 15 and 66 are shown in the relationship previously described with the latter being shown by full lines in view of the fact that these two films can be laminated by directing them about the laminating roller 46 and underneath the friction roller 43. Under certain circumstances this arrangement gives a satisfactory lamination. Improved results are obtained by evacuating the spaces 73 between the films 15 and 66 as they approach the laminating roller 46. For this purpose the vacuum chamber 61 is evacuated by the vacuum pump 62.

In FIG. 2 the film 16 is shown in broken line outline to indicate that it may or may not be applied depending upon whether the lamination is to be a three ply lamination. Here it will be observed that the idler roller 36 is positioned to the right and upwardly from its position shown in FIG. 1 and that it directs the film 16 to the laminating roller 46. The space 60 between the films 15 and 16 can be evacuated in the manner described in order to reduce the air that is to be squeezed out from between them as they move about the laminating roller 46 and underneath the friction roller 43.

The electrodes 63 and 74 are employed for the purposes described hereinbefore. It will be noted that the electrode 63 is arranged to apply an electrostatic charge to the underside of the film 16 rather than to the outer side of the film 15 as described in connection with FIG. 1. The electrode 74, when employed, serves to apply an electrostatic charge to the inside of the film 15 in the manner previously described.

When only the films 15 and 66 are to be laminated using the laminating apparatus 76, sufficient braking effect is applied to the unwind shaft 19 to tension the film 15 and to maintain this tension as it passes about the laminating roller 46. The tension thus applied assists in squeezing out the air in the space 73 from between the films 15 and 66. Also it applies a counterclockwise torque to the laminating lever 42 about the pivot axis 77 and causes the friction roller 43 to engage the outer surface of the film 15 as it is wound together with the film 66 about the rewind shaft 11 to form the roll 14 of laminated film. Similarly, when the film 16 is employed to provide a three ply lamination, sufficient braking force is applied to the unwind shaft 23 to tension the film 16. This tension is effective to assist in expelling air from the space 60 as the film 16 moves about the laminating roller 46 together with the film 15. In addition it serves to apply a counterclockwise torque to the laminating lever 42 that is reflected in the pressure that is applied by the friction roller 43 to the outer surface of the film 16 when it is used.

FIG. 3 shows certain other modifications of the present invention. Here it will be observed that the construction of the laminating apparatus, indicated generally at 80, is similar to the laminating apparatus 10 shown in FIG. 1, and the same reference characters have been applied to the same elements.

In the construction shown in FIG. 3, however, the films 15 and 16 are first juxtaposed by directing them about the idler roller 34 and beneath the friction roller 31, and then subsequently laminated by directing the films about the laminating roller 46 and underneath the friction roller 43 after passage over idler rollers 57 and 50, respectively. Under certain circumstances this arrangement gives improved lamination. Further, improved results are sometimes obtained by evacuating the space 79 between the films 15 and 16 as they approach the idler roller 34.

The electrode 63 is employed for the purposes described hereinbefore.

There follows a list of films that can be laminated using the present invention, it being possible to laminate together films of like material or to laminate together any one film with any other film in this list, or the herein described films with other coated film such as saran coated cellophane and the like. It will be understood that the films mentioned are illustrative of films that can be laminated in accordance wth this invention.

polyvinyl chloride
polyvinyl acetate
cellulose acetate
cellulose butyrate
cellulose triacetate
cellulose nitrate
saran (a crystalline copolymer of vinylidene chloride and vinyl chloride)
Pliofilm (rubber hydrochloride)
nylon (polyamide)
acrylic
cellophane (re-generated cellulose)
polyethylene
polystyrene
Teflon (polytetrafluoroethylene)
mylar (polyester)
polyvinyl alcohol
polypropylene In this regard, the following are exemplary of film pairs that have been combined utilizing the present invention; saran-polyethylene, saran-polypropylene, saran-polystyrene, saran-cellophane, saran-mylar and polyethylene-polyethylene.

It will be apparent that certain combinations of films above set forth can be laminated when the present invention is employed which are listed in U.S. Patent No. 2,679,969, issued June 1, 1954, in the name of Frederic A. Richter, col. 3, lines 37–49, as incapable of being laminated. Regardless of the theories advanced in this patent, when the films 15 and 16 or 66, 15 and 16 are laminated as described therein, they are held together, not because of any "inherent attractive forces in the face-to-face surfaces of the adjoining plies" but rather they are held together as a result of the pressure exerted by the surrounding air on the outer sides of the films 15 and 16 if the laminate is of two plies and on the outer surfaces of the films 66 and 16 if the laminate is of three plies. By expelling substantially all of the air from between the films 15 and 16 or from between the films 66, 15 and 16, there is a corresponding increase in the effective pressure with which the surrounding atmospheric air bears on the outermost surfaces to hold the layers or plies together. By applying an electrostatic charge to one or both surfaces of the film 15, in the manner described herein, there is no change in the inherent attractive forces in the juxtaposed surfaces but rather there is an application of extraneous electrostatic charge which increases the adhesion of the juxtaposed surfaces. The presence or absence of a layer of ink has no bearing on the adhesion between the films when they are laminated in accordance with this invention.

What is claimed as new is:

1. Apparatus for laminating flexible films comprising
   (a) means for winding the films in inner and outer overlying relation to form a roll of multilayer laminated film,
   (b) means for feeding the films individually to said winding means,
   (c) a laminating roller about which the films are trained disposed between said winding means and said feeding means,
   (d) means for tensioning the outer film as it approaches said laminating roller, and
   (e) means for applying pressure transversely of the films as they move into juxtaposition under said laminating roller under the control of the tension of the outer film.

2. The invention, as set forth in claim 1, wherein the means for tensioning the outer film is shifted in accordance with increase in diameter of the roll of laminated film and is characterized by applying the tension to the outer film substantially independently of increase in such diameter.

3. The invention, as set forth in claim 1, wherein means are provided for removing air from the space where the films initially are juxtaposed to reduce trapping of air between said films after they are laminated.

4. The invention, as set forth in claim 1, wherein means are provided for applying an electrostatic charge to the side of the film to be juxtaposed to the outer film to increase the adherence of the films after they are laminated.

5. The invention, as set forth in claim 1, wherein three films are fed individually to the winding means and the three films as they move into juxtaposition about the laminating roller are under the control of the outer film.

6. The invention, as set forth in claim 5, wherein means are provided for removing air from the space where the intermediate film is initially juxtaposed to the outer and inner films to reduce trapping of air between said films after they are laminated.

7. The invention, as set forth in claim 5, wherein means are provided for applying electrostatic charges to both sides of the intermediate film to increase its adherence to the outer and inner films after they are laminated.

8. Apparatus for laminating flexible films comprising:
   (a) a rewind shaft for winding the films in inner and outer overlying relation to form a roll of multilayer laminated film,
   (b) upper and lower unwind shafts parallel to and below said rewind shaft for mounting rolls of inner and outer films respectively,
   (c) a support,
   (d) an arm pivoted to said support about an axis in parallel lateral spaced relation to the axis of rotation of said rewind shaft,
   (e) a first friction roller rotatably mounted on said arm intermediate its ends,
   (f) a first idler roller mounted for rotation about a fixed axis below said first friction roller and engageable thereby for receiving therebetween said outer film from said lower unwind shaft,
   (g) a laminating lever pivoted to said arm about the axis of rotation of said first friction roller,
   (h) a second friction roller rotatably mounted on said laminating lever and positioned over and engageable with said outer film of said roll of laminated film,
   (i) a laminating roller mounted for rotation on said laminating lever between its pivot mounting on said arm and said second friction roller and about which said inner and outer films are laminated,
   (j) a second idler roller mounted for rotation on said laminating lever between its pivot mounting on said arm and said laminating roller for directing said outer film to said laminating roller,
   (k) a tension lever pivoted to said arm about an axis parallel to and spaced from its pivot axis and beyond said first friction roller,
   (l) a third friction roller mounted for rotation on said tension lever and positioned over and engageable with said laminating roller for receiving therebetween said inner and outer films, and
   (m) a third idler roller mounted for rotation on said tension lever between its pivot mounting on said arm and said third friction roller about which said outer film is trained in its passage between said first idler roller and said second idler roller whereby tension applied to said outer film is effective to cause said third friction roller to apply pressure to said films between it and said laminating roller to squeeze out air therebetween.

9. The invention, as set forth in claim 8, wherein means are provided for removing air from the space where the films initially are juxtaposed to reduce the amount of air that is to be squeezed out by the pressure applied to the films between said laminating roller and said third friction roller.

10. The invention, as set forth in claim 8, wherein an idler roller individual to the upper unwind shaft has the inner film thereabout and directs the same to the laminating roller.

11. The invention, as set forth in claim 10, wherein means are provided for applying an electrostatic charge to the side of the inner film to be juxtaposed to the outer film at a location between the laminating roller and the idler roller individual to the upper unwind shaft to increase the adherence of the films after they are laminated.

12. The invention, as set forth in claim 8, wherein:
   (a) an additional unwind shaft is located above the upper unwind shaft for mounting a third roll of film to underlie the inner film which then is an intermediate film, and
   (b) an idler roller individual to the additional unwind shaft has the last mentioned inner film thereabout and directs the same to the laminating roller.

13. The invention, as set forth in claim 12, wherein means are provided for removing air from the space where the three films initially are juxtaposed to reduce the amount of air to be squeezed out by the pressure applied to the films between the laminating roller and the third friction roller.

14. The invention, as set forth in claim 12, wherein means are provided for applying an electrostatic charge to both sides of the intermediate film at a location between the laminating roller and the idler roller individual to the intermediate film to increase its adherence to the overlying films after they are laminated.

15. Apparatus for laminating flexible films comprising:
(a) means for winding the films in inner and outer overlying relation to form a roll of multilayer laminated film,
(b) means for feeding the films individually to said winding means,
(c) a laminating roller about which the films are trained disposed between said winding means and said feedings means, and
(d) means for evacuating the space where the films initially are juxtaposed about said laminating roller.

16. The invention, as set forth in claim 15, wherein three films are supplied by the feeding means about the laminating roller and are conjointly wound by the winding means.

17. Apparatus for laminating flexible films comprising:
(a) means for winding the films in inner and outer overlying relation to form a roll of multilayer laminated film,
(b) means for feeding the films individually to said winding means,
(c) a laminating roller about which the films are trained disposed between said winding means and said feeding means, and
(d) means for applying an electrostatic charge to the side of one of the films to be juxtaposed to a side of the other film to increase the adherence of the films after they are laminated.

18. The invention, as set forth in claim 17, wherein three films are supplied by the feeding means about the laminating roller and are conjointly wound by the winding means with one of each pair of juxtaposed sides of the films being electrostatically charged.

19. Apparatus for laminating flexible films comprising:
(a) means for winding the films in inner and outer overlying relation to form a roll of multilayer laminated film,
(b) means for feeding the films individually to said winding means,
(c) a laminating roller about which the films are trained disposed between said winding means and said feeding means,
(d) a laminating lever pivotally mounted at one end and rotatably mounting said laminating roller intermediate its ends, and
(e) a friction roller rotatably mounted on the other end of said laminating lever and positioned over and engageable with said outer film of said roll of laminated film.

20. The invention, as set forth in claim 19, wherein the outer film is tensioned as it moves about the laminating roller and pressure exerted by the friction roller on said outer film of the roll of laminated film is caused in part by the tension of said outer film.

21. A process for producing unitary multilayered laminated film and sheet-like structures in the absence of adhesives, elevated temperatures and high pressures, comprising:
(a) bringing the planar surfaces of at least two plies of flexible film materials into juxtaposition in a relatively tensioned condition,
(b) removing essentially all of the air between the juxtaposed surfaces of said plies and,
(c) combining said plies in inner and outer overlying relation by employing a laminating pressure which is under control of tension of one of said films, said pressure being substantially constant.

22. The process of claim 21, wherein an electrostatic charge is applied to at least one side of one or more of said plies of flexible film materials prior to juxtaposition with the remaining plies of said flexible film materials.

23. The process of claim 21, wherein said plies of flexible film materials are brought into juxtaposition under sub-atmospheric pressure.

24. The process of claim 21, wherein all of said plies are composed of a flexible thermoplastic material.

25. The process of claim 21, wherein at least one of said plies is composed of a thermoplastic material.

26. Apparatus for laminating flexible films comprising:
(a) a rewind shaft for winding the films in inner and outer overlying relation to form a roll of multilayer laminated film,
(b) unwind shafts parallel to said rewind shaft for mounting rolls of inner and outer films respectively,
(c) a support,
(d) a laminating lever pivoted to said support about an axis in parallel lateral spaced relation to the axis of rotation of said rewind shaft,
(e) a friction roller rotatably mounted on said laminating lever and positioned over and engageable with said outer film of said roll of laminated film,
(f) a laminating roller mounted for rotation on said laminating lever between its pivot mounting on said support and said friction roller and about which said inner and outer films are laminated, and
(g) guide means for directing said films to said laminating roller.

References Cited
UNITED STATES PATENTS

| | | | |
|---|---|---|---|
| 2,082,114 | 6/1937 | Littlefield | 156—324 |
| 2,972,369 | 2/1961 | Jensen | 156—324 |
| 3,054,708 | 9/1962 | Steinberg | 156—272 |
| 3,165,432 | 1/1965 | Plaskett | 156—244 |
| 3,249,482 | 5/1966 | Gilfillan | 156—324 |

EARL M. BERGERT, *Primary Examiner.*

D. J. DRUMMOND, *Examiner.*